(12) United States Patent
Cai et al.

(10) Patent No.: US 10,632,816 B2
(45) Date of Patent: Apr. 28, 2020

(54) FREON REFILLING APPARATUS FOR VEHICLES

(71) Applicants: Zhuo Cai, Taizhou (CN); Weicai Jiang, Taizhou (CN); Genfa Mao, Taizhou (CN)

(72) Inventors: Zhuo Cai, Taizhou (CN); Weicai Jiang, Taizhou (CN); Genfa Mao, Taizhou (CN)

(73) Assignee: Qianjiang Group Wenling Jennfeng Industry Inc., Taizhou (CN)

( * ) Notice: Subject to any disclaimer, the term of this patent is extended or adjusted under 35 U.S.C. 154(b) by 912 days.

(21) Appl. No.: 15/166,259

(22) Filed: May 27, 2016

(65) Prior Publication Data
US 2017/0225539 A1    Aug. 10, 2017

(30) Foreign Application Priority Data
Feb. 4, 2016    (CN) .......................... 2016 1 0081375

(51) Int. Cl.
| B60H 1/00 | (2006.01) |
| F16L 29/02 | (2006.01) |
| F16L 15/00 | (2006.01) |
| F25B 45/00 | (2006.01) |

(52) U.S. Cl.
CPC ........ *B60H 1/00585* (2013.01); *F16L 15/003* (2013.01); *F16L 29/02* (2013.01); *F25B 45/00* (2013.01)

(58) Field of Classification Search
CPC ................ F25B 45/00; F25B 2345/006; F25B 2345/001; B60H 1/00585; F16L 29/02; F16L 15/003
See application file for complete search history.

(56) References Cited

U.S. PATENT DOCUMENTS

| 5,139,049 | A | * | 8/1992 | Jensen | ..................... F16L 37/34 137/614.05 |
| 6,385,986 | B1 |   | 5/2002 | Ferris et al. |   |
| 6,698,466 | B1 |   | 3/2004 | Cowan et al. |   |
| 9,243,829 | B1 | * | 1/2016 | Parnell | ..................... F25B 45/00 |
| 2005/0217285 | A1 |   | 10/2005 | Carrubba et al. |   |
| 2006/0113327 | A1 | * | 6/2006 | Walters | ............... B05B 11/3014 222/153.11 |
| 2007/0228190 | A1 | * | 10/2007 | Tanner | ..................... B05B 1/302 239/526 |

(Continued)

Primary Examiner — Frantz F Jules
Assistant Examiner — Martha Tadesse
(74) Attorney, Agent, or Firm — Minder Law Group; Willy H. Wong

(57) ABSTRACT

The present Freon refilling apparatus for vehicles comprises a tube fitting and a refilling duct. The tube fitting is connected to the refilling duct. The lower end of the tube fitting has a connection port to connect with gas cylinders. A pushrod is movably inserted into the tube fitting in its axial direction. Between the tube fitting and the upper end of the pushrod, there is an operating mechanism which can push the pushrod down to the lower end of the tube fitting. When the pushrod moves downwards, its lower end can make the gas cylinder connected to the tube fitting. The present Freon refilling apparatus for vehicles is applicable to different types of gas cylinders storing Freon. This provides a more convenient way to refill Freon for automobile air conditioners, with a lower cost.

17 Claims, 10 Drawing Sheets

(56) References Cited

U.S. PATENT DOCUMENTS

| | | | | |
|---|---|---|---|---|
| 2008/0022701 A1* | 1/2008 | Carrubba | ........... | B60H 1/00585 62/77 |
| 2011/0041522 A1* | 2/2011 | Carrubba | ................ | F16K 1/308 62/77 |
| 2012/0192576 A1* | 8/2012 | Carrubba | ........... | B60H 1/00585 62/77 |
| 2012/0324920 A1* | 12/2012 | Carrubba | ........... | B60H 1/00585 62/77 |
| 2013/0118187 A1* | 5/2013 | Carrubba | ................ | F25B 45/00 62/77 |
| 2013/0261532 A1* | 10/2013 | Trow | ....................... | A61D 7/00 604/19 |
| 2015/0108176 A1* | 4/2015 | Koban | ................... | B65D 83/20 222/402.25 |
| 2015/0184911 A1* | 7/2015 | Pistone | .................. | F25B 45/00 62/79 |

* cited by examiner

FREON REFILLING APPARATUS FOR VEHICLES

RELATED APPLICATIONS

This application claims benefit to Chinese Patent Application No. CN201610081375.4, filed Feb. 4, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the technical field of vehicle maintenance tools, and particularly to a Freon refilling apparatus for vehicles.

Related Art

With the rapid development of the automobile industry, especially the cars; over the past few years, the automobile parts manufacturing industry has also developed rapidly. As an important component to improve the ride comfort of automobiles, the automotive air conditioner has been widely recognized by automobile manufacturers and consumers. The air conditioner system is a standalone sealed circulating system. As required, a certain amount of refrigerant should be filled into the compressor, and Freon is commonly used. During the long term usage of automobiles, the cooling performance gets poor. One reason for that is the leakage of Freon; therefore, it is necessary to refill Freon into the compressor.

A certain amount of Freon is sealed in specially manufactured gas cylinders. As shown in FIG. 1, the first gas cylinder (1) has a gas outlet. The outlet has a connection flange, and there is an external thread on the outer wall of the connection flange. Inside the connection flange, there is an air drain, which is sealed by the diaphragm (11). An appropriate refilling apparatus is needed to refill Freon into automobile air conditioners, and it has a pin secured to it. The first gas cylinder is threaded to the refilling apparatus through the connection flange. With the rotation of the first gas cylinder, the diaphragm (11) gradually approaches the pin and gets pierced by it; hence, the first gas cylinder is opened. However, there is an issue that it is difficult to close the first gas cylinder after it is opened. If Freon in the first gas cylinder is not used up, the rest of Freon will go into the atmosphere and pollute the environment.

In order to avoid such an issue, the second gas cylinder is designed. As shown in FIG. 2, the second gas cylinder has an outlet. The outlet has a connection flange, and there is an external thread on the outer wall of the connection flange. Inside the connection flange, there is an air drain. The valve core (21), the valve core seal (22) and the sealing spring are connected inside the air drain. Under the force from the sealing spring, the valve core (21) presses against the valve core seal (22) to seal the second gas cylinder. An appropriate refilling apparatus is needed to refill Freon into automobile air conditioners, and it has a pushrod secured to it. The second gas cylinder is threaded to the refilling apparatus through the connection flange. With the rotation of the second gas cylinder, the valve core (21) gradually approaches the pushrod and gets opened by it; hence, the second gas cylinder is opened. However, there is an issue that both of the first gas cylinder and the second gas cylinder need special refilling apparatuses respectively to get opened, which results in a poor ease of use and a high operating cost.

SUMMARY OF THE INVENTION

One objective of a preferred embodiment of the present invention is to avoid the issues stated above in the prior art, and to provide a Freon refilling apparatus for vehicles. The present Freon refilling apparatus is applicable to different types of gas cylinders storing Freon, and provides a more convenient way to refill Freon for automobile air conditioners with a lower cost.

One object of the preferred embodiment of the present invention can be achieved by the following technical proposal:

A Freon refilling apparatus for vehicles comprises a tube fitting and a refilling duct to be used to connect to automobile air conditioners. The tube fitting is connected to the refilling duct. It is characterized in that:

The lower end of the tube fitting has a connection port to connect with gas cylinders. A pushrod is movably inserted into the tube fitting in its axial direction. Between the tube fitting and the upper end of the pushrod, there is an operating mechanism which can push the pushrod down to the lower end of the tube fitting. When the pushrod moves downwards, its lower end can make the gas cylinder connect with the tube fitting.

One end of the refilling duct is connected to the automobile air conditioner, and the other end is connected to the tube fitting. Gas cylinders are divided into the first gas cylinder sealed with the diaphragm and the second gas cylinder sealed with the valve core. The connection flanges of the first gas cylinder and the second gas cylinder have the same structure and dimensions; therefore, the connection port of the tube fitting fits the connection flanges of both the first gas cylinder and the second gas cylinder. When the first gas cylinder is connected to the connection port of the tube fitting, the pushrod is coaxial with the first gas cylinder; however, since there is a clearance between the end of the pushrod and the diaphragm of the first gas cylinder, it will not be opened. By handling the operating mechanism by hand, the pushrod moves towards the first gas cylinder, till the lower end of the pushrod pierces the diaphragm of the first gas cylinder. Hence, the first gas cylinder is opened. The gas in the first gas cylinder enters into the tube fitting through the tear in the diaphragm, passes through the refilling duct, and gets into the automobile air conditioner. Similarly, when the second gas cylinder is connected to the connection port of the tube fitting, the pushrod is coaxial with the second gas cylinder; however, since there is a clearance between the end of the pushrod and the diaphragm of the second gas cylinder, it will not be opened. By handling the operating mechanism by hand, the pushrod moves towards the second gas cylinder, till the end of the pushrod presses against the valve core of the second gas cylinder, to detach the valve core from the sealing washer. Hence, the second gas cylinder is opened. The gas in the second gas cylinder enters into the tube fitting through the clearance between the valve core and the sealing washer, passes through the refilling duct, and gets into the automobile air conditioner. After the refilling is complete, by releasing the operating mechanism, the valve core gets back to its original position under the action of the reset spring and seals the cylinder again. Therefore, the present refilling apparatus are applicable to not only the first gas cylinder with the diaphragm, but also the second gas cylinder with the valve core, which provides a more convenient way to refill Freon for automobile air conditioners with a lower cost.

In the Freon refilling apparatus for vehicles, the lower end of the pushrod is acute. There is an air passage hole designed at the lower end, and there is a vent hole designed at the wall of the pushrod. The vent hole is connected to the upper end of the air passage hole. It is easier for the pushrod's acute lower end to pierce into the diaphragm of the first gas cylinder. Of course, in actual operations, when the pushrod pierces into the diaphragm, the operating mechanism shall be released appropriately to allow the pushrod to move upward a little, so that there is a clearance between the acute lower end and the rim of the tear in the diaphragm, which is better for the gas in the first gas cylinder to enter into the tube fitting. On the other hand, when the pushrod's acute lower end presses against the valve core of the second gas cylinder, the small contact area between the pushrod's acute lower end and the valve core can prevent the pushrod from clogging the outlet of the second gas cylinder, and allows the gas to flow more smoothly from the second gas cylinder.

In the Freon refilling apparatus for vehicles, the acute lower end of the pushrod is a slope structure or a cone structure. the lower end of the pushrod is a slope, the air passage hole penetrates through the slope. When the lower end of the pushrod presses against the valve core of the second gas cylinder, there is a clearance between the slope and the valve core, and the air passage hole is connected to the second gas cylinder through such a clearance. This allows Freon in the second gas cylinder to quickly flow and enter into the tube fitting, and the refilling efficiency is improved. When the pushrod pierces the diaphragm of the first gas cylinder, the clearance between the pushrod and the diaphragm is small, and the air passage velocity is small. Therefore, Freon in the first gas cylinder can more quickly flow and enter into the tube fitting, through the proposed air passage hole and the vent hole, and hence the refilling efficiency is improved. If the lower end of the pushrod is a cone, the air passage hole penetrates through the conical surface. Furthermore, in the practical machining process, after the air passage hole, at the lower end of the pushrod, is fabricated, the air passage hole may be machined into a thin-walled structure, so that it is easier to pierce the diaphragm.

In the Freon refilling apparatus for vehicles, there is a sealing cone on the inside wall of the tube fitting, which is located between the refilling duct and the connection port. The end with a bigger diameter of the sealing cone faces downward. An annular sealing block is secured to the pushrod, and a reset spring is installed over the pushrod. One end of the reset spring presses against the tube fitting, and the other end presses against the pushrod. When the pushrod is no longer subjected to the force from the operating mechanism, the pushrod will be reset and drive the sealing block to press against the sealing cone under the action of the reset spring. The sealing block is located in the passage between the refilling duct and the connection port. After the refilling process of the automotive air conditioner completes, the operating mechanism is reset. Under the action of the reset spring, the pushrod moves to its original position, and drives the sealing block to press against the sealing cone. Hence, the connection between the refilling duct and the gas cylinder is blocked, which prevents Freon backflow from the air conditioner after the refill completes.

In the Freon refilling apparatus for vehicles, from top to bottom, the tube fitting consecutively comprises the guide segment, the block segment and the connection segment. The inner diameter of the block segment is bigger than that of the guide segment, and, in between the block segment and the guide segment, the sealing cone is formed. The guide segment provides the movement of the pushrod with restrictions and guide. The block segment can block the tube fitting when the pushrod moves to its original position, so as to prevent Freon backflow from the air conditioner. The connection segment is used to connect the first gas cylinder or the second gas cylinder.

In the Freon refilling apparatus for vehicles, an annular sealing groove is designed on the outer wall of the pushrod, in the circumferential direction, and a sealing ring is installed in the sealing groove. The sealing ring presses against the inner wall of the guide segment. The upper end of the pushrod needs to stretch out of the guide segment of the tube fitting, to connect with the operating mechanism. Hence, a sealing ring is installed on the pushrod, to achieve the seal between the outer wall of the pushrod and the inner wall of the guide segment, so as to avoid the leakage of Freon from the guide segment.

In the Freon refilling apparatus for vehicles, there is an air passage clearance between the outer wall of the pushrod and the inner wall of the guide segment. The air passage clearance is connected to the block segment. There is, radially, a tube-connecting part on the outer wall of the tube fitting, and the tube-connecting part is connected to the air passage clearance. One end of the refilling duct is secured on the tube-connecting part. The gas enters into the tube-connecting part through the connection segment and the block segment and through the air passage clearance, so that the gas flows smoothly even after the pushrod is installed onto the tube fitting.

In the Freon refilling apparatus for vehicles, the operating mechanism comprises an operating handle. There is a connection part on the outer wall of the tube fitting. One end of the operating handle is hinged to the connection part, and the other end is bended to the side of the tube fitting. There is a push part on the operating handle and there is the active push slope on the push part. There is the passive push slope on the end of the pushrod stretching out of the tube fitting. The active push slope presses against the passive push slope. One end of the operating handle is hinged to the connection part of the tube fitting. The other end of the operating handle and the push part are both located on the same side of hanged joint. When the other end of the operating handle is pressed in the direction toward the tube fitting, the push part moves downward. Meanwhile, the active push slope presses against the passive push slope and drives the pushrod. The operation is convenient. Of course, the operating mechanism could be a press part on the pushrod, which stretches out of the tube fitting. By pressing the press part directly, the pushrod moves as well.

In the Freon refilling apparatus for vehicles, the exterior of the tube fitting is secured with an outer shell. The first avoidance opening is designed on the outer shell, and the free end of the operating handle passes through the first avoidance opening. The second avoidance opening is designed on the operating handle, and the refilling duct passes through the second avoidance opening and the first avoidance opening. The operating handle is hinged with the confining plate. A confining cavity is designed at the edge on the free end of the confining plate, in the lengthwise direction. The edge of the first avoidance opening that is next to the tube fitting is the confining edge, and the confining cavity of the confining plate can clamp on the confining edge. The outer shell covers the tube fitting, the tube-connecting part and part of the operating handle. Besides, both of the operating handle and the refilling duct are located in the same side of the tube fitting, which achieves a more compact structure. When the present refilling apparatus is not in use, the confining plate clamps on the confining edge of the first avoidance opening, to prevent the end of the operating handle from swinging toward the tube fitting. Namely, this avoids opening the first gas cylinder or the second gas cylinder by mistake.

In the Freon refilling apparatus for vehicles, a connection bushing is secured inside the connection segment. The inner wall of the connection bushing has the upper threaded segment and the lower threaded segment. The connection port is the lower threaded segment. The confining bushing is screwed into the upper threaded segment, and the inner diameter of the confining bushing is less than that of the block segment. One end of the reset spring presses against the end face of the confining bushing. A sealing washer is secured to the connection bushing, between the upper threaded segment and the lower threaded segment. The upper threaded segment is connected to the confining bushing by means of thread, to confine the reset spring. Also, the preload force of the reset spring can be adjusted by the confining bushing. The lower threaded segment is used to connect to the connection flange of the first gas cylinder and the second gas cylinder by means of thread. After the first gas cylinder and the second gas cylinder are screwed tightly, the connection flange can press against the sealing washer, and hence seal between the tube fitting and the first gas cylinder or the second gas cylinder.

Compared to the prior art, the present Freon refilling apparatus for vehicles has the following advantages:

1. Since the movement of the pushrod can not only pierce the diaphragm of the first gas cylinder, but also push the valve core. The present refilling apparatus is applicable to the first gas cylinder with the diaphragm, as well as the second gas cylinder with the valve core, which provides a more convenient way to refill Freon for automobile air conditioners, with a lower cost.
2. Under the action of the reset spring, the pushrod moves to its original position, and drives the sealing block to press against the sealing cone. Hence, the connection between the cavity of the connection portend the air passage clearance is blocked, which prevents the Freon in the air conditioner returning after the refill completes.
3. When the present refilling apparatus is not in use, the confining plate clamps on the confining edge of the first avoidance opening, to prevent the end of the operating handle from swinging toward the tube fitting. Namely, this avoids opening the first gas cylinder and the second gas cylinder by mistake.

DETAILED DESCRIPTION OF THE INVENTION

Figure 1:
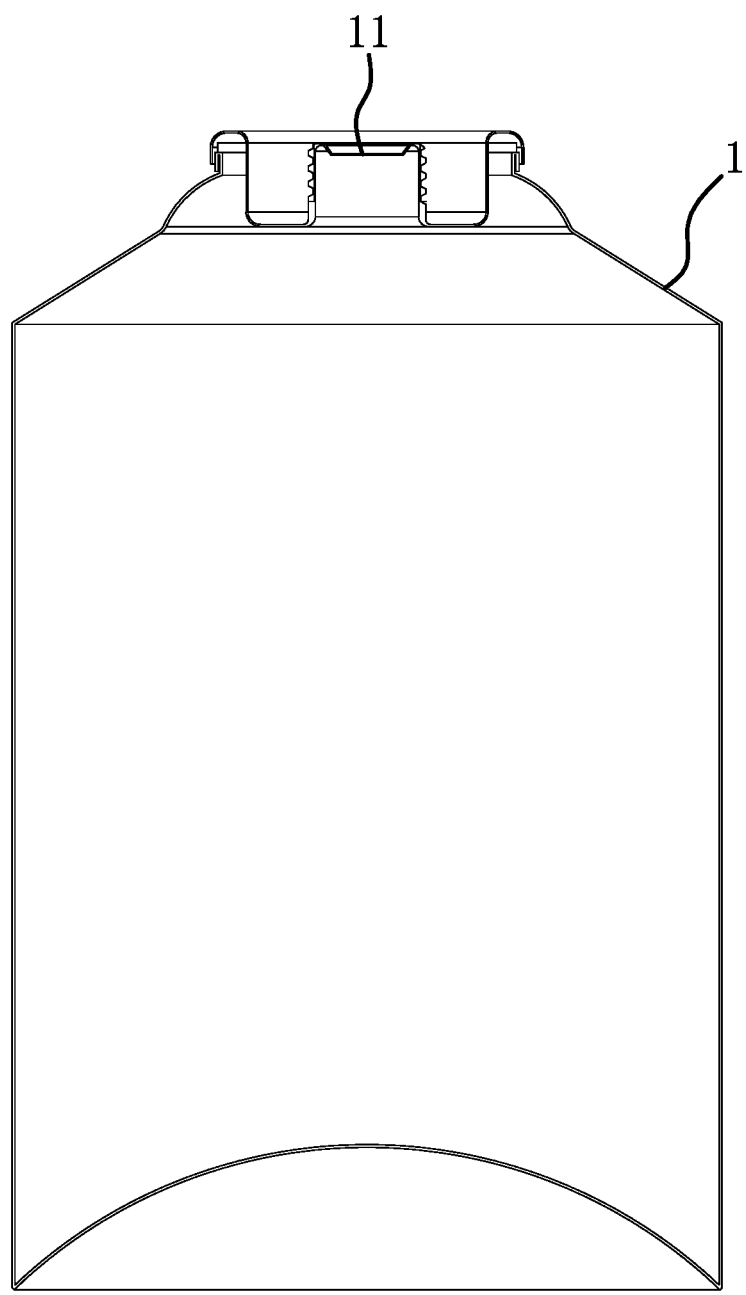
FIG. 1 is a sectional view of one preferred embodiment of the first gas cylinder.
Figure 2:
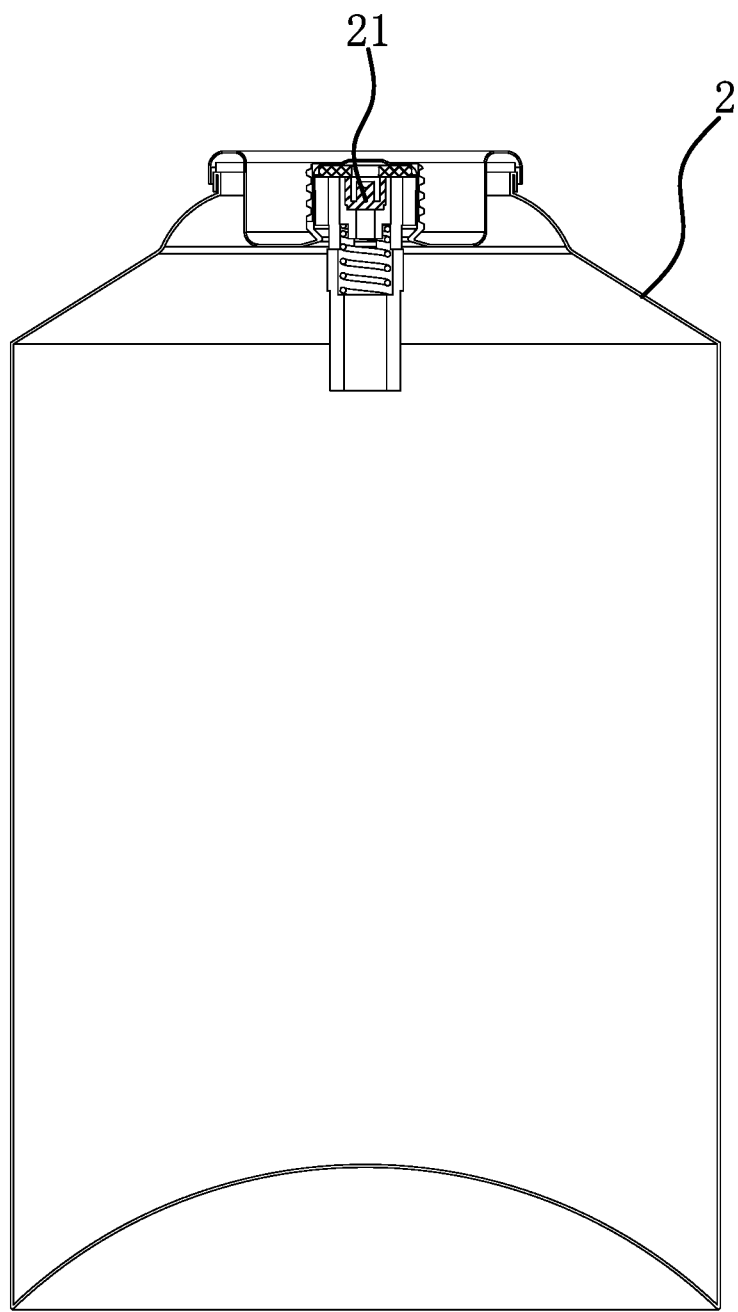
FIG. 2 is a sectional view of one preferred embodiment of the second gas cylinder.
Figure 3:
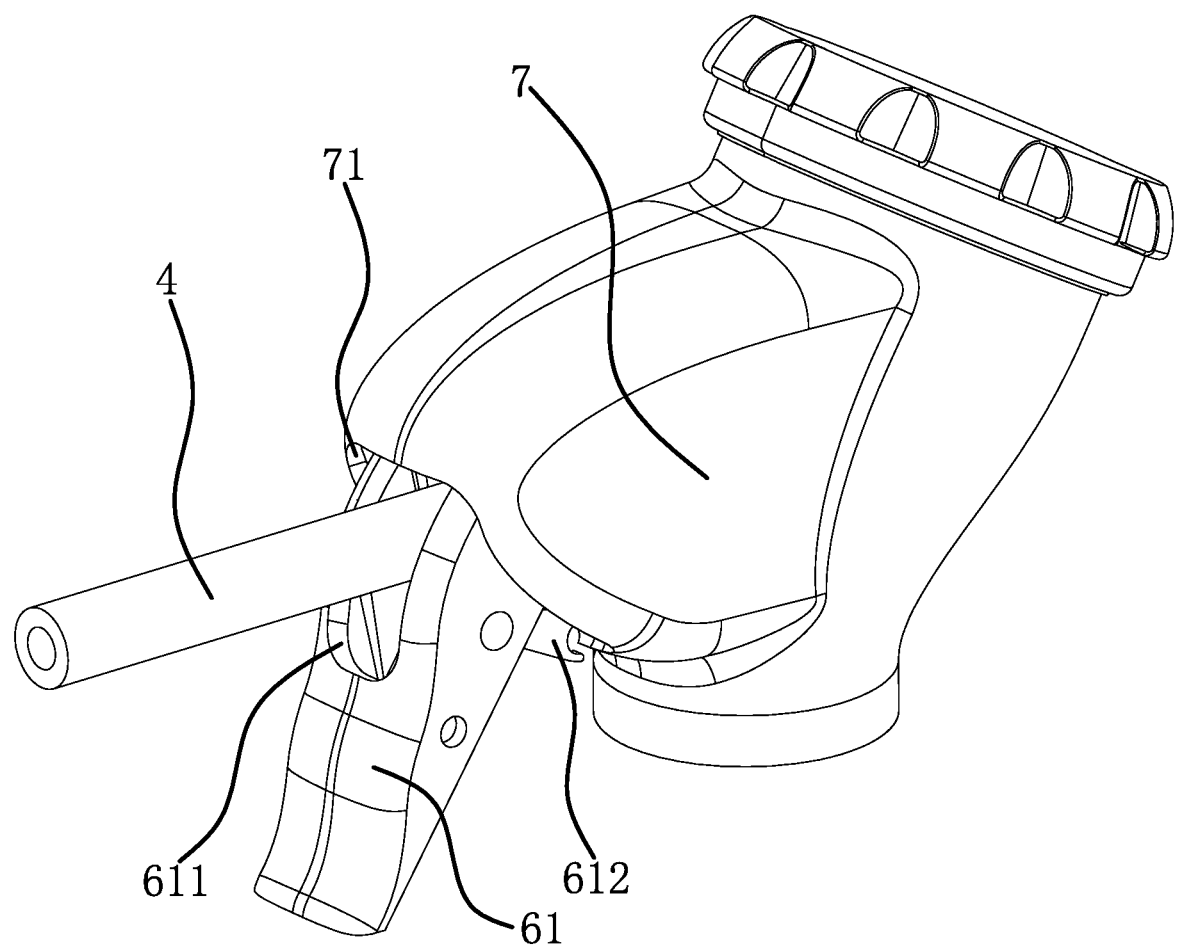
FIG. 3 is a perspective view of one preferred embodiment of the present Freon refilling apparatus for vehicles.
Figure 4:
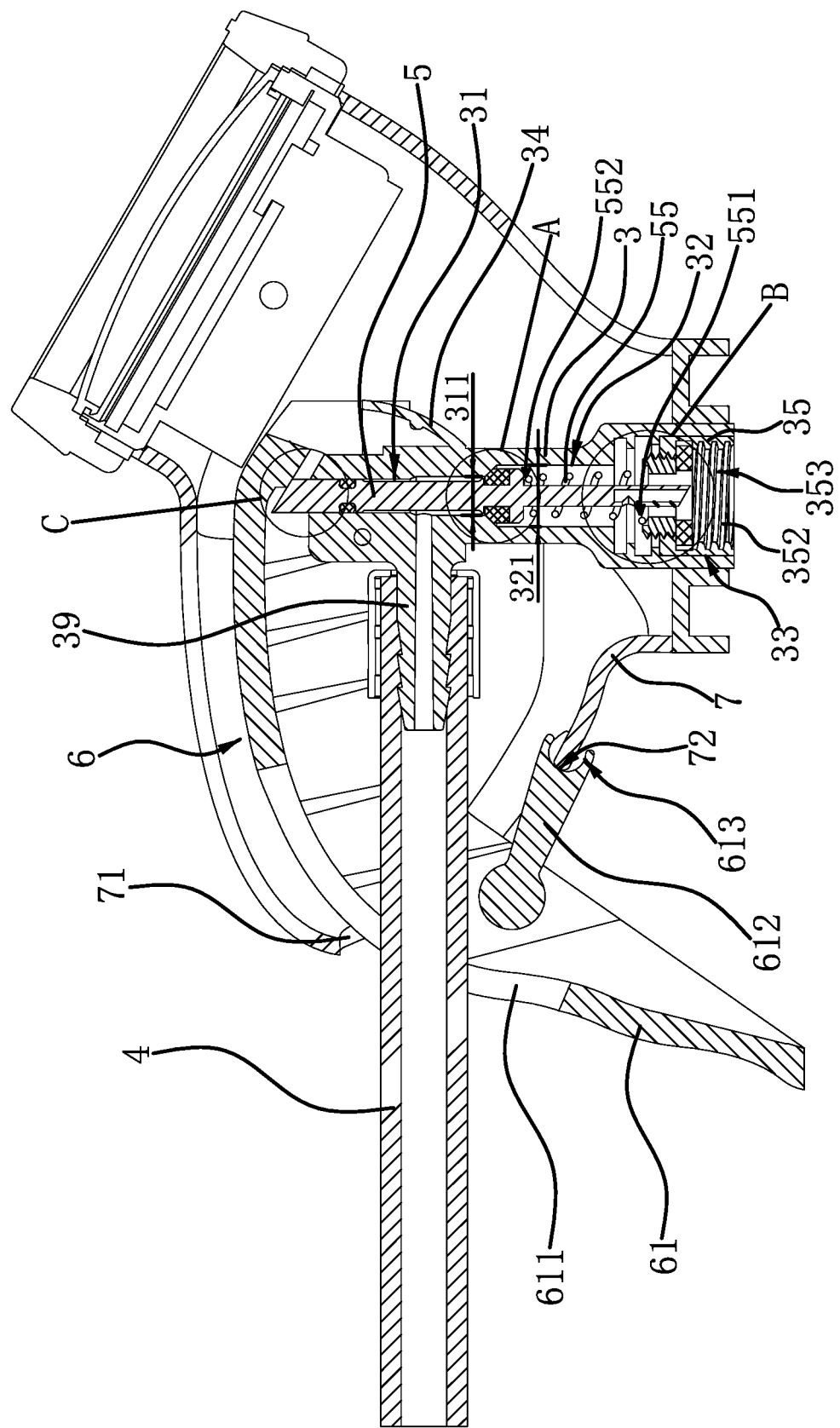
FIG. 4 is a sectional view of one preferred embodiment of the present Freon refilling apparatus for vehicles.

The preferred embodiments of the present invention will be described below and the technical proposals of the invention will be further illustrated in connection with the accompanying figures. However, the present invention shall not be limited to these embodiments.

As shown in FIG. 3, FIG. 4, FIG. 9, and FIG. 10, a Freon refilling apparatus for vehicles comprises a refilling duct (4) and a tube fitting (3). One end of the refilling duct (4) is connected to the automobile air conditioner, and the other end is connected to the tube fitting (3). On one end of the tube fitting (3), there is a connection port (353) that can connect with both outlets of the first gas cylinder (1) and the second gas cylinder (2). Namely, the connection flanges of the first gas cylinder (1) and the second gas cylinder (2) have the same structure and dimensions, therefore; the connection port (353) of the tube fitting (3) fits the connection flanges of both of the first gas cylinder (1) and the second gas cylinder (2). A pushrod (5) is movably inserted into the tube fitting (3) in its axial direction. One end of the pushrod (5) stretches out of the other end of the tube fitting (3). There is an operating mechanism (6) which can push the pushrod (5) in the direction to the connection port (353) of the tube fitting (3) at the end of the tube fitting (3). When the first gas cylinder (1) is connected to the connection port (353) of the tube fitting (3), the pushrod (5) is coaxial with the first gas cylinder (1); however, since there is a clearance between the end of the pushrod (5) and the diaphragm (11) of the first gas cylinder (1), the first gas cylinder (1) will not be opened. By handling the operating mechanism (6) by hand, the pushrod (5) moves towards the first gas cylinder (1), till the end of pushrod (5) pierces the diaphragm (11) of the first gas cylinder (1). Hence, the first gas cylinder (1) is opened. The gas in the first gas cylinder enters into the tube fitting (3) through the tear in the diaphragm (11), passes through the refilling duct (4), and gets into the automobile air conditioner. Similarly, when the second gas cylinder (2) is connected to the connection port (353) of the tube fitting (3), the pushrod (5) is coaxial with the second gas cylinder (2); however, since there is a clearance between the end of the pushrod (5) and the valve core (21) of the second gas cylinder (2), the second gas cylinder (2) will not be opened. By handling the operating mechanism by hand, the pushrod (5) moves towards the second gas cylinder (2), till the end of pushrod (5) presses against the valve core (21) of the second gas cylinder (2), to detach the valve core (21) from the valve core seal (22). Hence, the second gas cylinder (2) is opened. The gas in the gas cylinder (2) enters into the tube fitting (3) through the clearance between the valve core (21) and the valve core seal (22), passes through the refilling duct (4), and gets into the automobile air conditioner. After the refilling is complete, by releasing the operating mechanism (6), the valve core (21) gets back to its original position under the action of the sealing spring and seals the cylinder again. Therefore, the present refilling apparatus are applicable to not only the first gas cylinder (1) with the diaphragm (11), but also the second gas cylinder (2) with the valve core (21), which provides a more convenient way to refill Freon for automobile air conditioners with a lower cost.

Specifically, the lower end of the pushrod (5) is acute. There is an air passage hole (57) designed at the lower end of the pushrod (5), and there is a vent hole (58) designed at the side wall of the pushrod (5). The vent hole (58) is connected to the upper end of the air passage hole (57). It is easier for an acute lower end to pierce into the diaphragm (11) of the first gas cylinder (1). Of course, in actual operations, when the pushrod (5) pierces into the diaphragm (11), the operating mechanism (6) shall be released appropriately to allow the pushrod (5) to move upward a little, so that there is a clearance between the acute lower end and the rim of the tear in the diaphragm (11), which is better for the gas in the first gas cylinder (1) to enter into the tube fitting (3). On the other hand, when the acute lower end presses against the valve core (21) of the second gas cylinder (2), the small contact area between the acute lower end and the valve core (21) can prevent the pushrod (5) from clogging the outlet of the second gas cylinder (2), and allows the gas to flow more smoothly from the second gas cylinder (2). The acute lower end of the pushrod (5) is a slope, and the air passage hole (57) penetrates through the slope. The lower end of the pushrod (5) may also be a cone, and the air passage hole (57) penetrates through the conical surface. When the lower end of the pushrod (5) presses against the valve core (21) of the second gas cylinder (2), there is a clearance between the slope and the valve core (21), and the air passage hole (57) is connected to the second gas cylinder (2) through that clearance. This allows Freon in the second gas cylinder (2) to quickly flow and enter into the tube fitting (3), and the refilling efficiency is improved. When the pushrod (5) pierces the diaphragm of the first gas cylinder (1), the clearance between the pushrod (5) and the diaphragm (11) is small, and the air passage velocity is small. Therefore, Freon in the first gas cylinder (1) can more quickly flow and enter into the tube fitting (3), through the proposed air passage hole (57) and the vent hole (58), and hence the refilling efficiency is improved. Furthermore, in the practical machining process, after the air passage hole (57), at the lower end of the pushrod (5), is fabricated, the air passage hole (57) may be machined into a thin-walled structure, so that it is easier to pierce the diaphragm (11).

Figure 5:
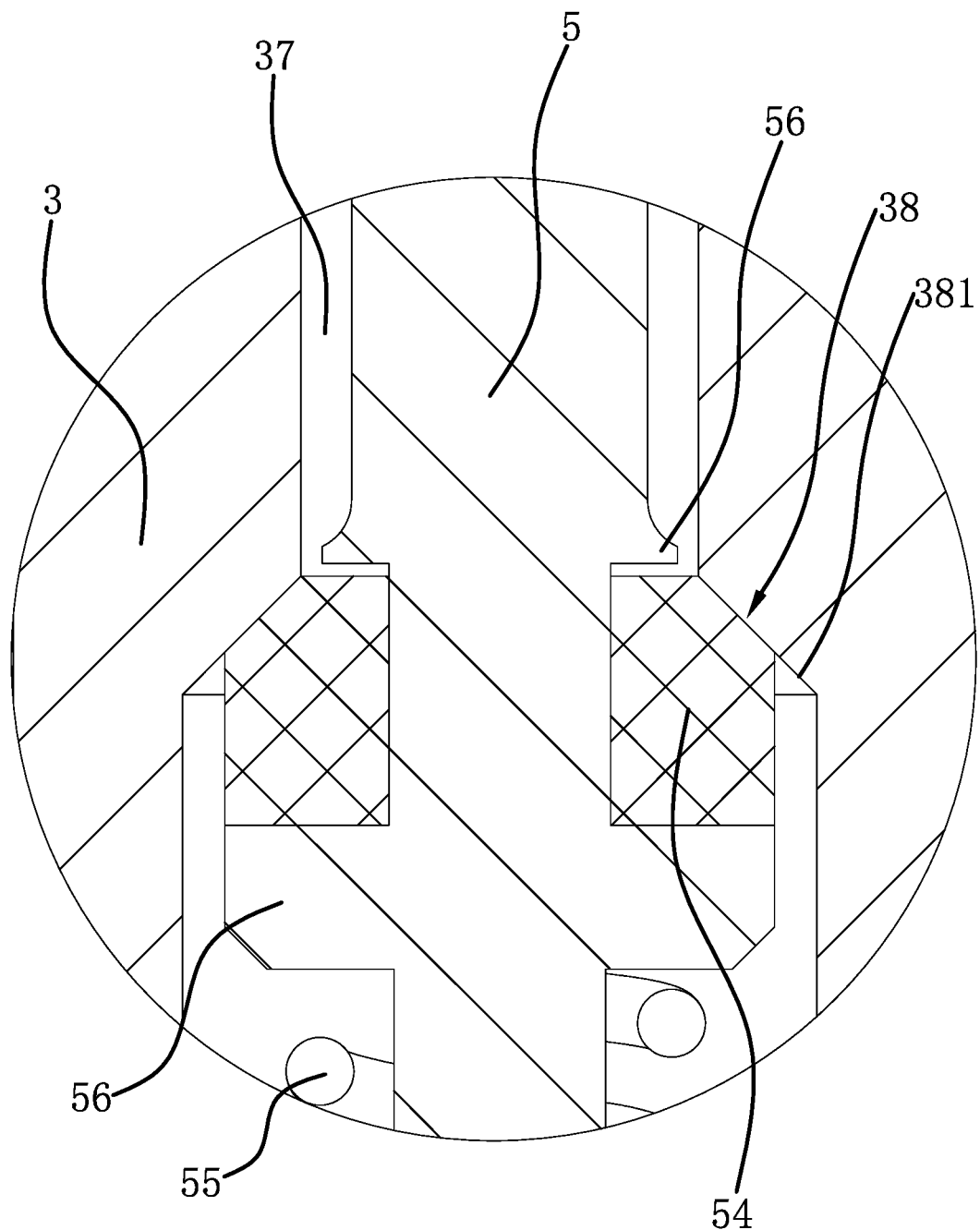
FIG. 5 is a detailed view of Section A in FIG. 4.

As shown in FIG. 5, the tube fitting (3) comprises the guide segment (31), the block segment (32) and the connection segment (33). The block segment (32) is located between the guide segment (31) and the connection segment (33). The guide segment (31) provides the movement of the pushrod (5) with restrictions and guide. One end of the pushrod (5) stretches out of the guide segment (31). The connection port (353) is located in the connection segment (33), and used to connect to the first gas cylinder (1) or the second gas cylinder (2). The other end of the pushrod (5) inserts into the connection segment (33). The block segment (32) can block the tube fitting (3) when the pushrod moves to its original location, so as to prevent Freon backflow from the air conditioner. An annular sealing groove (51) is designed on the outer wall of the pushrod (5), in the circumferential direction, and a sealing ring (52) is installed in the sealing groove (51). The sealing ring (52) presses against the inner wall of the guide segment (31). The end of the pushrod (5) needs to stretch out of the guide segment (31) of the tube fitting (3), to connect with the operating mechanism (6). Hence, a sealing ring (52) is installed on the pushrod (5), to achieve the seal between the outer wall of the pushrod (5) and the inner wall of the guide segment (31), so as to avoid the leakage of Freon from the guide segment (31) of the tube fitting (3). A connection bushing (35) is secured inside the connection segment (33). The inner wall of the connection bushing (35) has the upper threaded segment (351) and the lower threaded segment (352). The confining bushing (36) is screwed into the upper threaded segment (351), and the inner diameter of the confining bushing (36) is less than that of the block segment (32). One end of the reset spring (55) presses against the end face of the confining bushing (36), to limit the reset spring (55). Also, the preload force of the reset spring (55) can be adjusted by the confining bushing (36). A sealing washer (361) is secured to the connection bushing (35), between the upper threaded segment (351) and the lower threaded segment (352). The connection port (353) is the lower threaded segment (352), and it is used to connect to the connection flanges of the first gas cylinder (1) or the second gas cylinder (2) by means of thread. After the first gas cylinder (1) and the second gas cylinder (2) are screwed tightly, the connection flange can press against the sealing washer (361), and hence seal between the tube fitting (3) and the first gas cylinder (1) or the second gas cylinder (2). There is an air passage clearance (37) between the outer wall of the pushrod (5) and the inner wall of the guide segment (31). The air passage clearance (37) is connected to the block segment (32). There is, radially, a tube-connecting part (39) on the outer wall of the tube fitting (3), and the tube-connecting part (39) is connected to the air passage clearance (37). One end of the refilling duct (4) is secured on the tube-connecting part (39). The gas enters into the tube-connecting part (39) through the connection segment (33) and the block segment (32) and through the air passage clearance (37), so that the gas flows smoothly even after the pushrod (5) is installed onto the tube fitting (3).

Figure 6:
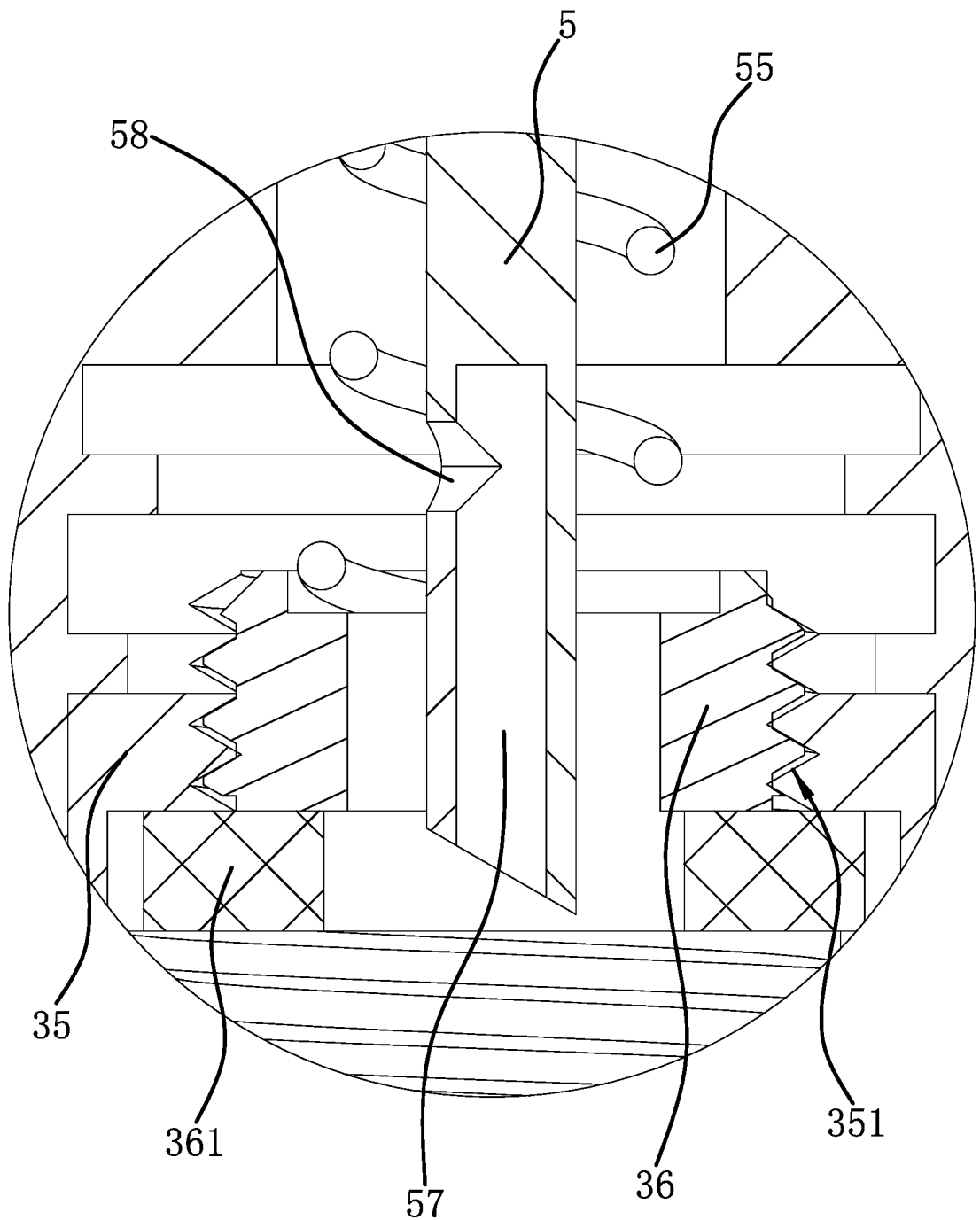
FIG. 6 is a detailed view of Section B in FIG. 4.

As shown in FIG. 6, the inner diameter of the block segment (32) is bigger than that of the guide segment (31), and, in between the block segment (32) and the guide segment (31), the sealing cone (38) is formed. An annular sealing block (54) is secured to the pushrod (5), and a reset spring (55) is installed over the pushrod (5). One end of the reset spring (55) presses against the tube fitting (3), and the other end presses against the pushrod (5). When the pushrod (5) is no longer subjected to the force from the operating mechanism (6), the sealing block (54) will press against the sealing cone (38) under the action of the reset spring (55). The sealing block (54) is located between the connection segment (33) and the air passage clearance (37). After the refilling process of the automotive air conditioner completes, the operating mechanism (6) is reset. Under the action of the reset spring (55), the pushrod (5) moves to its original position, and drives the sealing block (54) to press against the sealing cone (38). Hence, the connection between the connection segment (33) and the air passage clearance (37) is blocked, which prevents Freon backflow from the air conditioner after the refill completes. On the outer wall of the pushrod (5), there are two circular confining flanges (56), and the sealing block is located between the two confining flanges (56). One end of the locating spring presses against the end face of one of the confining flanges (56). The confining flanges locate the sealing block (54), and the side of the confining flanges presses against the sealing block (54), which prevents the gas from leaking from the area between the sealing block (54) and the guide rod. Meanwhile, the reset spring (55) affects the pushrod (5) by pressing against the confining flanges (56). The structure is simplified. The air passage hole (57) is designed on the end of the pushrod (5) facing the connection port (353), in the axial direction. The vent hole (58) is designed on the wall of the pushrod (5), connected to the air passage hole (57). The end face of the pushrod (5) facing the connection port (353) is a slope, and the inlet of the air passage hole (57) penetrates through the slope at the end of the pushrod (5). When the pushrod (5) pierces the diaphragm (11) of the first gas cylinder (1), the vent hole (58) is outside of first gas cylinder (1). When the connection port (353) is connected to the first gas cylinder (1), the pushrod (5) pierces the diaphragm (11) of the first gas cylinder (1). Meanwhile, the clearance between the pushrod (5) and the diaphragm (11) is small, and the air passage velocity is small. Therefore, Freon in the first gas cylinder (1) can more quickly flow and enter into the connection segment (33), through the proposed air passage hole (57) and the vent hole (58), and hence the refilling efficiency is improved.

Figure 7:
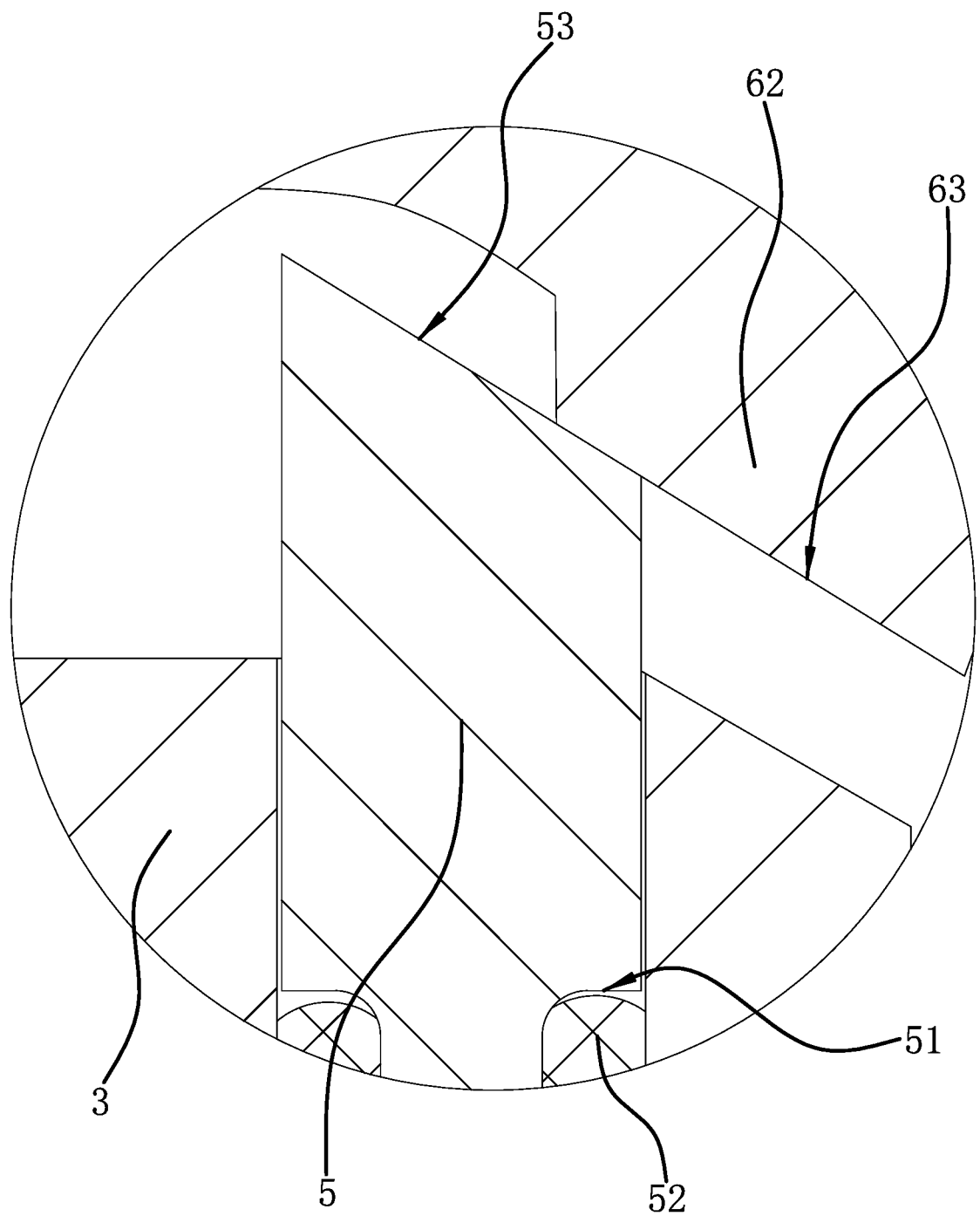
FIG. 7 is a detailed view of Section C in FIG. 4.
Figure 8:
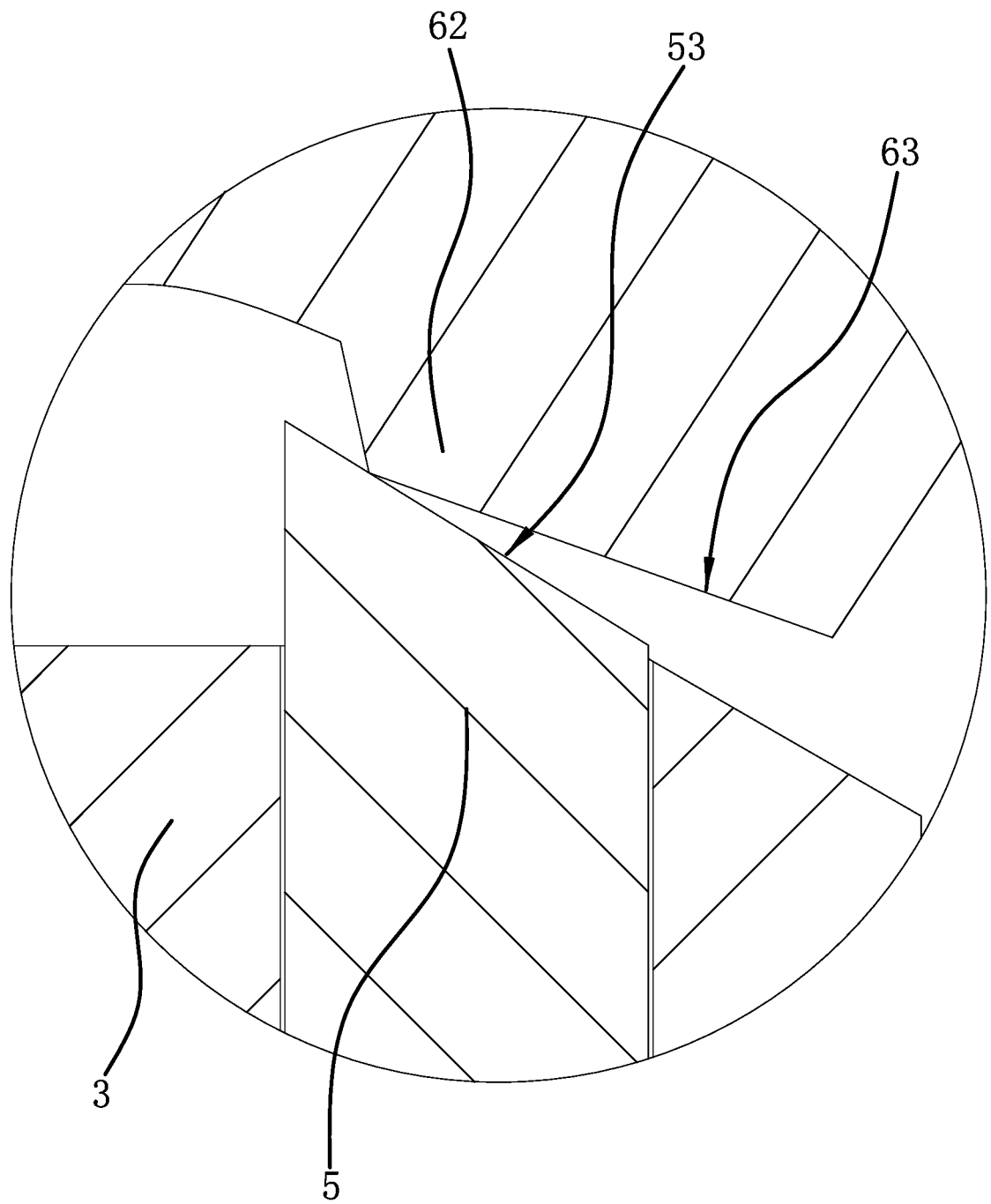
FIG. 8 is a detailed view of Section C in FIG. 4 after the pushrod is pushed.
Figure 9:
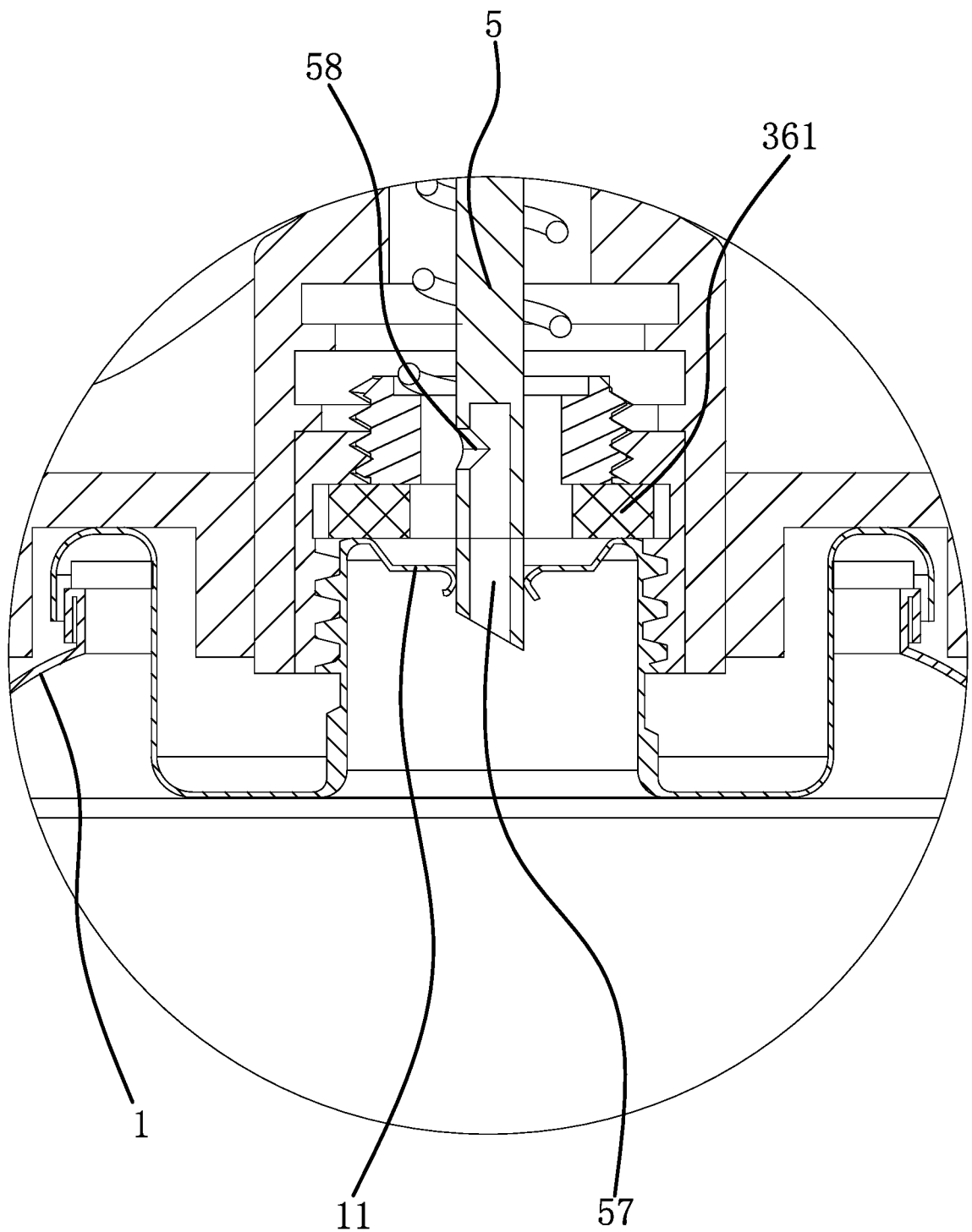
FIG. 9 is a detailed view after the diaphragm of first gas cylinder is pierced.
Figure 10:
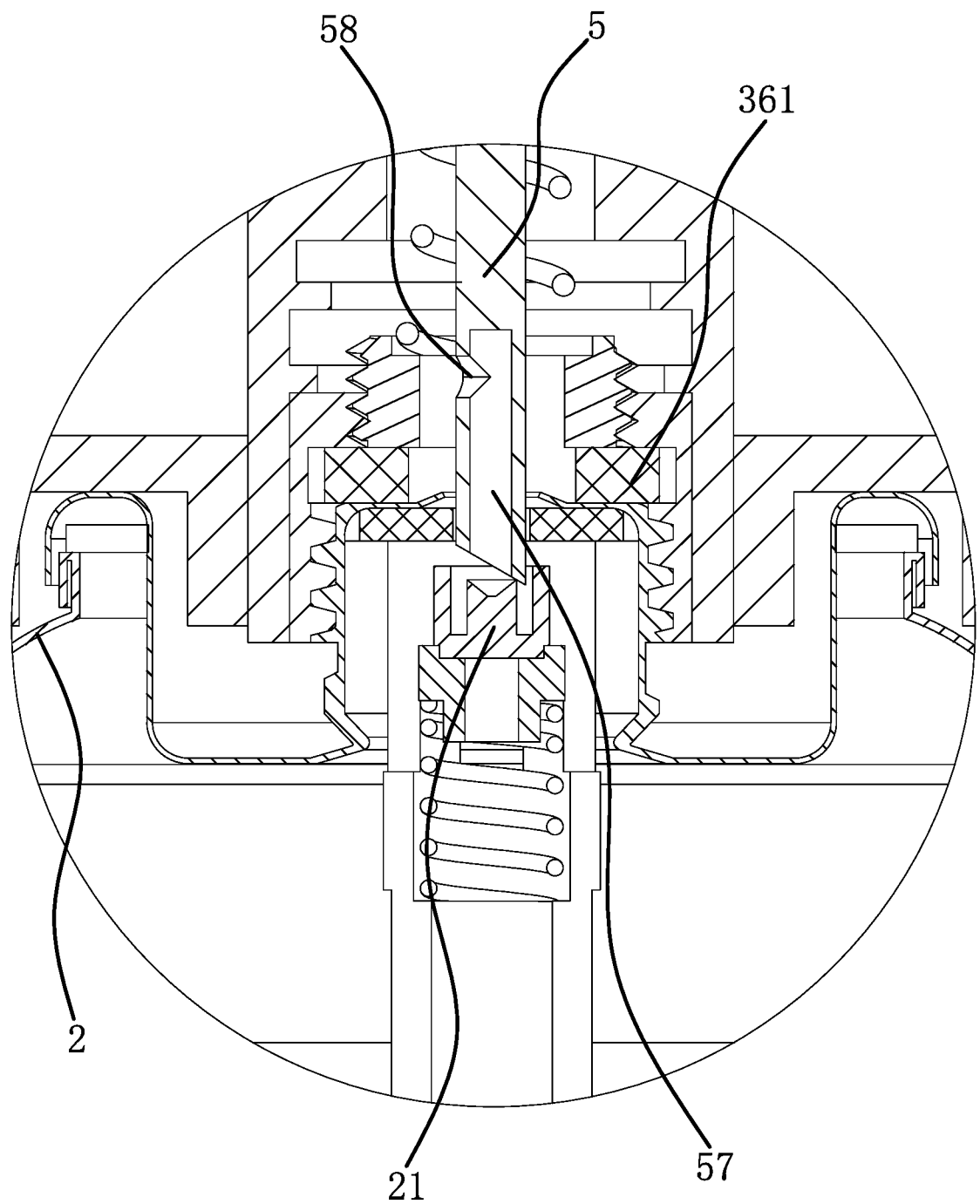
FIG. 10 is a detailed view after the valve core of second gas cylinder is pushed by the pushrod.

As shown in FIG. 7 and FIG. 8, the operating mechanism (6) comprises the operating handle (61), and there is a connection part (34) on the outer wall of the tube fitting (3). One end of the operating handle (61) is hinged to the connection part (34), and the other end is bended to the side of the tube fitting (3). There is a push part (62) on the operating handle (61) and there is the active push slope (63) on the push part (62). The upper end of the pushrod (5) stretches out of the tube fitting (3), and there is the passive push slope (53) on this end. The active push slope (63) presses against the passive push slope (53). One end of the operating handle (61) is hinged to the connection part (34) of the tube fitting (3). The other end of the operating handle (61) and the push part (62) are both located on the same side of hanged joint. When the other end of the operating handle (61) is pressed in the direction toward the tube fitting (3), the push part (62) moves downward. Meanwhile, the active push slope (63) presses against the passive push slope (53) and drives the pushrod (5). The operation is convenient. The exterior of the tube fitting (3) is secured with an outer shell (7). The first avoidance opening (71) is designed on the outer shell (7), and the free end of the operating handle (61) passes through the first avoidance opening (71). The second avoidance opening (611) is designed on the operating handle (61), and the refilling duct (4) passes through the second avoidance opening (611) and the first avoidance opening (71). The confining plate (612) is also hinged to the operating handle (61). A confining cavity (613) is designed at the edge on the free end of the confining plate (612), in the lengthwise direction. The edge of the first avoidance opening (71) that is next to the tube fitting (3) is the confining edge (72), and the confining cavity (613) of the confining plate (612) can clamp on the confining edge (72). The outer shell (7) covers the tube fitting (3), the tube-connecting part (39) and part of the operating handle (61). Besides, both of the operating handle (61) and the refilling duct (4) are located in the same side of the tube fitting (3), which achieves a more compact structure. When the present refilling apparatus is not in use, the confining plate (612) clamps on the confining edge (72) of the first avoidance opening (71), to prevent the end of the operating handle (61) from swinging toward the tube fitting (3). Namely, this avoids opening the first gas cylinder (1) and the second gas cylinder (2) by mistake.

The description of the preferred embodiments thereof serves only as an illustration of the spirit of the invention. It will be understood by those skilled in the art that various changes or supplements in form and details may be made therein without departing from the spirit and scope of the invention as defined by the appended claims.

Although the terms of first gas cylinder (1), diaphragm (11), second gas cylinder (2) and etc. are often used herein, it does not exclude the possibility to use any other terms. Using such terms is only to describe or explain the nature of the present invention more conveniently. Any additional restrictions are contrary to the spirit of the present invention.

LIST OF REFERENCE NUMERALS

1 First Gas Cylinder
11 Diaphragm
2 Second Gas Cylinder
21 Valve Core
22 Valve core seal
3 Tube Fitting
31 Guide Segment
311 Second inner diameter
32 Block Segment
321 First inner diameter
33 Connection Segment
34 Connection Part
35 Connection Bushing
351 Upper Threaded Segment
352 Lower Threaded Segment
353 Connection Port
36 Confining Bushing
361 Sealing Washer
37 Air Passage Clearance
38 Sealing Cone
381 Bib End
39 Tube-connecting Part
4 Refilling Duct
5 Pushrod
51 Annular Sealing Groove
52 Sealing Ring
53 Passive Push Slope
54 Sealing Block
55 Reset Spring
551 First End of the Reset Spring
552 Second End of the Reset Spring
56 Confining Flange
57 Air Passage Hole
58 Vent Hole
6 Operating Mechanism
61 Operating Handle
611 Second Avoidance Opening
612 Confining Plate
613 Confining Cavity
32 Push Part
63 Active Push Slope
7 Outer Shell
71 First Avoidance Opening

What is claimed is:

1. A Freon refilling apparatus for vehicles comprising:
a tube fitting (3) with a connection part (34);
a refilling duct (4) capable of connecting to automobile air conditioners, the tube fitting (3) connected to the refilling duct (4);
a lower end of the tube fitting (3) with a connection port (353) capable of connecting with gas cylinder;
a pushrod (5) movably inserted into the tube fitting (3) in an axial direction;
an operating handle (61) with a push part (62) capable of pushing the pushrod (5) down to the lower end of the tube fitting (3); and
a confining plate (612) hinged to the operating handle (61) capable of locking the operating handle (61);
wherein when the pushrod (5) moves downwards, a lower end of the pushrod (5) causes the gas cylinder to connect with the tube fitting (3); and wherein a first end of the operating handle (61) is hinged to the connection part (34), a second end is bent to a side of the tube fitting (3), there is an active push slope (63) on the push part (62) and the active push slope (63) is an oblique plane, an upper end of the pushrod (5) stretches out of the tube fitting (3), there is a passive push slope (53) on the upper end of the pushrod (5) and the passive push slope (53) is an oblique plane, and the active push slope (63) presses against the passive push slope (53) to form plane contact when the confining plate (612) locks the operating handle (61).

2. The Freon refilling apparatus for vehicles of claim 1 wherein the lower end of the pushrod (5) is acute, there is an air passage hole (57) designed at the lower end of the pushrod (5), there is a vent hole (58) designed at a side wall of the pushrod (5), and the vent hole (58) is connected to an upper end of the air passage hole (57).

3. The Freon refilling apparatus for vehicles as claimed in claim 2 wherein the lower end of the pushrod (5) is a slope structure.

4. The Freon refilling apparatus for vehicles of claim 1 wherein there is a sealing cone (38) on an inside wall of the tube fitting (3), the sealing cone (38) is located between the refilling duct (4) and the connection port (353), a big end (381) of the sealing cone (38) is facing downward, an annular sealing block (54) is secured to the pushrod (5), a reset spring (55) is installed over the pushrod (5), a first end of the reset spring (551) presses against the tube fitting (3), a second end of the reset spring (552) presses against the pushrod (5), and when the pushrod (5) is no longer subjected to a force from the operating handle (61), the pushrod (5) is reset under a force from the reset spring (55) and drives the sealing block (54) to press against the sealing cone (38).

5. The Freon refilling apparatus for vehicles of claim 4 wherein from top to bottom, the tube fitting (3) consecutively comprises a guide segment (31), a block segment (32) and a connection segment (33);
wherein a first inner diameter (321) of the block segment (32) is bigger than a second inner diameter (311) of the guide segment (31); and
wherein in between the block segment (32) and the guide segment (31), the sealing cone (38) is formed.

6. The Freon refilling apparatus for vehicles of claim 5 wherein an annular sealing groove (51) is designed on an outer wall of the pushrod (5) in a circumferential direction, a sealing ring (52) is installed in the annular sealing groove (51), and the sealing ring (52) presses against an inner wall of the guide segment (31).

7. The Freon refilling apparatus for vehicles of claim 5 wherein there is an air passage clearance (37) between an outer wall of the pushrod (5) and an inner wall of the guide segment (31), the air passage clearance (37) is connected to the block segment (32), there is radially a tube-connecting part (39) on an outer wall of the tube fitting (3), the tube-connecting part (39) is connected to the air passage clearance (37), and an end of the refilling duct (4) is secured on the tube-connecting part (39).

8. The Freon refilling apparatus for vehicles of claim 1 wherein an exterior of the tube fitting (3) is secured with an outer shell (7), a first avoidance opening (71) is designed on the outer shell (7), a free end of the operating handle (61) passes through the first avoidance opening (71), a second avoidance opening (611) is designed on the operating handle (61), the refilling duct (4) passes through the second avoidance opening (611) and the first avoidance opening (71), a confining cavity (613) is designed at an edge on a free end of the confining plate (612) in a lengthwise direction, an edge of the first avoidance opening (71) that is next to the tube fitting (3) is a confining edge (72), and the confining cavity (613) of the confining plate (612) is capable of clamping on the confining edge (72).

9. The Freon refilling apparatus for vehicles of claim 5 wherein a connection bushing (35) is secured inside the connection segment (33), an inner wall of the connection bushing (35) has an upper threaded segment (351) and a lower threaded segment (352), the connection port (353) is the lower threaded segment (352), a confining bushing (36) is screwed into the upper threaded segment (351), and an inner diameter of the confining bushing (36) is less than that of the block segment (32), an end of the reset spring (55) presses against an end face of the confining bushing (36), a sealing washer (361) is secured to the connection bushing (35) between the upper threaded segment (351) and the lower threaded segment (352).

10. The Freon refilling apparatus for vehicles of claim 2 wherein there is a sealing cone (38) on an inside wall of the tube fitting (3), the sealing cone (38) is located between the refilling duct (4) and the connection port (353), a big end (381) of the sealing cone (38) is facing downward, an annular sealing block (54) is secured to the pushrod (5), a reset spring (55) is installed over the pushrod (5), a first end of the reset spring (551) presses against the tube fitting (3), a second end of the reset spring (552) presses against the pushrod (5), and when the pushrod (5) is no longer subjected to a force from the operating handle (61), the pushrod (5) is reset under a force from the reset spring (55) and drives the sealing block (54) to press against the sealing cone (38).

11. The Freon refilling apparatus for vehicles of claim 10 wherein from top to bottom, the tube fitting (3) consecutively comprises a guide segment (31), a block segment (32) and a connection segment (33);
wherein a first inner diameter (321) of the block segment (32) is bigger than a second inner diameter (311) of the guide segment (31); and
wherein in between the block segment (32) and the guide segment (31), the sealing cone (38) is formed.

12. The Freon refilling apparatus for vehicles of claim 11 wherein an annular sealing groove (51) is designed on an outer wall of the pushrod (5) in a circumferential direction, a sealing ring (52) is installed in the annular sealing groove (51), and the sealing ring (52) presses against an inner wall of the guide segment (31).

13. The Freon refilling apparatus for vehicles of claim 11 wherein there is an air passage clearance (37) between an outer wall of the pushrod (5) and an inner wall of the guide segment (31), the air passage clearance (37) is connected to the block segment (32), there is radially a tube-connecting part (39) on an outer wall of the tube fitting (3), the tube-connecting part (39) is connected to the air passage clearance (37), and an end of the refilling duct (4) is secured on the tube-connecting part (39).

14. The Freon refilling apparatus for vehicles of claim 3 wherein there is a sealing cone (38) on an inside wall of the tube fitting (3), the sealing cone (38) is located between the refilling duct (4) and the connection port (353), a big end (381) of the sealing cone (38) is facing downward, an annular sealing block (54) is secured to the pushrod (5), a reset spring (55) is installed over the pushrod (5), a first end of the reset spring (551) presses against the tube fitting (3), a second end of the reset spring (552) presses against the pushrod (5), and when the pushrod (5) is no longer subjected to a force from the operating handle (61), the pushrod (5) is reset under a force from the reset spring (55) and drives the sealing block (54) to press against the sealing cone (38).

15. The Freon refilling apparatus for vehicles of claim 14 wherein from top to bottom, the tube fitting (3) consecutively comprises a guide segment (31), a block segment (32) and a connection segment (33);
    wherein a first inner diameter (321) of the block segment (32) is bigger than a second inner diameter (311) of the guide segment (31); and
    wherein in between the block segment (32) and the guide segment (31), the sealing cone (38) is formed.

16. The Freon refilling apparatus for vehicles of claim 15 wherein an annular sealing groove (51) is designed on an outer wall of the pushrod (5) in a circumferential direction, a sealing ring (52) is installed in the annular sealing groove (51), and the sealing ring (52) presses against an inner wall of the guide segment (31).

17. The Freon refilling apparatus for vehicles of claim 15 wherein there is an air passage clearance (37) between an outer wall of the pushrod (5) and an inner wall of the guide segment (31), the air passage clearance (37) is connected to the block segment (32), there is radially a tube-connecting part (39) on an outer wall of the tube fitting (3), the tube-connecting part (39) is connected to the air passage clearance (37), and an end of the refilling duct (4) is secured on the tube-connecting part (39).

\* \* \* \* \*